Aug. 22, 1967  A. E. ECKERMANN, JR  3,337,160
SPACE VEHICLE HORIZON SENSOR

Filed Jan. 23, 1964

INVENTOR.
ALFRED E. ECKERMANN JR.
BY
Arthur T. Groeninger
ATTORNEY

United States Patent Office 3,337,160
Patented Aug. 22, 1967

3,337,160
SPACE VEHICLE HORIZON SENSOR
Alfred E. Eckermann, Jr., Hasbrouck Heights, N.J., assignor to The Bendix Corporation, Eclipse-Pioneer Division, Teterboro, N.J., a corporation of Delaware
Filed Jan. 23, 1964, Ser. No. 339,742
10 Claims. (Cl. 244—1)

The invention relates to an infrared detector and particularly to an infrared detector capable of being used as a horizon scanner in an attitude control system for space vehicles.

Guidance systems for space vehicles comprise a platform that is stabilized relative to space and the stars, thereby establishing a space fixed guidance system of the three reference coordinates. The platform normally has a stabilizing gyroscope for each of the space vehicle pitch, roll and yaw axes. When the space vehicle departs from its predetermined position relative to the platform, a signal is supplied to a mechanism, which may comprise jet motors or motor driven flywheels, for bringing the vehicle back into the desired attitude.

In the desired attitude of a vehicle, the pitch axis is perpendicular to the flight path and parallel to the earth's surface. For this condition to be achieved in an orbiting space vehicle, the same side of the stabilized platform must be faced toward the earth throughout its orbit. This requires the vehicle to be continuously rotated about its pitch axis.

In accordance with the present invention, continual alignment in parallelism with the earth's surface is made possible by use of a horizon scanner particularly suitable for operation under space vehicle operating conditions. If such continuous alignment were not provided, a space vehicle, stabilized in space by means of three gyroscopes, would continually change its position relative to the horizon.

The present invention comprises a horizon scanner including an infrared detector which is mounted on a space vehicle so that it is exposed to a field of thermal radiation in the vicinity of the horizon. It is sensitive to the difference between the infrared radiation emitted from the earth and that emitted from neighboring space for generating an attitude error signal varying with tilt of the space vehicle relative to the horizon. Provision is made for means, responsive to this attitude error signal, for guiding the vehicle into a desired attitude relative to the horizon.

The process of infrared detection is complicated by the low thermal energy available from an earth target when viewed against a space background. Further, conventional semi-conductor detectors are damaged by penetrating high energy radiation encountered in space. The present invention overcomes these problems as it utilizes a detector which is not susceptible to radiation damage and which is highly sensitive to temperature change in the anticipated temperature range of a space vehicle which varies from −50° C. to +50° C.

An object of the present invention is to provide a highly sensitive infrared detector particularly suited for use as a horizon scanner in an attitude control system of a space vehicle.

Another object of the present invention is to provide a horizon scanner for space vehicles requiring only two thermal sensitive elements and capable of yielding relatively strong attitude error signals in comparison to conventional horizon scanners.

Another object of the present invention is to provide a horizon scanner for space vehicles which is not susceptible to radiation damage.

Another object of the present invention is to provide a horizon scanner including a magnetic sensing element whose magnetization varies in response to infrared radiation impinging thereon.

Another object of the present invention is to provide a horizon scanner comprising a magnetic circuit including a gadolinium strip, the magnetization of which varies sharply as a function of temperature in the temperature range of a spaceborne vehicle.

Another object of the present invention is to provide a horizon scanner as described in the last paragraph and including a signal generating means, responsive to a change in magnetization of the magnetic circuits, for generating a signal varying in magnitude depending on the extent to which the gadolinium strip is exposed to infrared radiation.

Another object of the present invention is to provide a horizon scanner having two magnetic circuits sensitive to the difference between the infrared radiation emitted from the earth and that emitted from neighboring space.

Another object of the present invention is to provide an attitude control system for a space vehicle including a horizon scanner as described in the last paragraph and including control means responsive to a change in the magnetization of the magnetic circuits for controlling the vehicle into a desired attitude relative to the horizon and the surface of the earth.

Another object of the present invention is to provide an attitude control system for a space vehicle as described in the preceding paragraph wherein the magnetic circuits include gadolinium strips and the control means is responsive to a control signal dependent on the difference in infrared radiation impinging on each of the gadolinium strips.

Another object of the present invention is to provide an attitude control system as described in the last paragraph wherein the control signal varies in polarity depending on whether infrared radiation is impinging on one, both or neither of the gadolinium strips.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
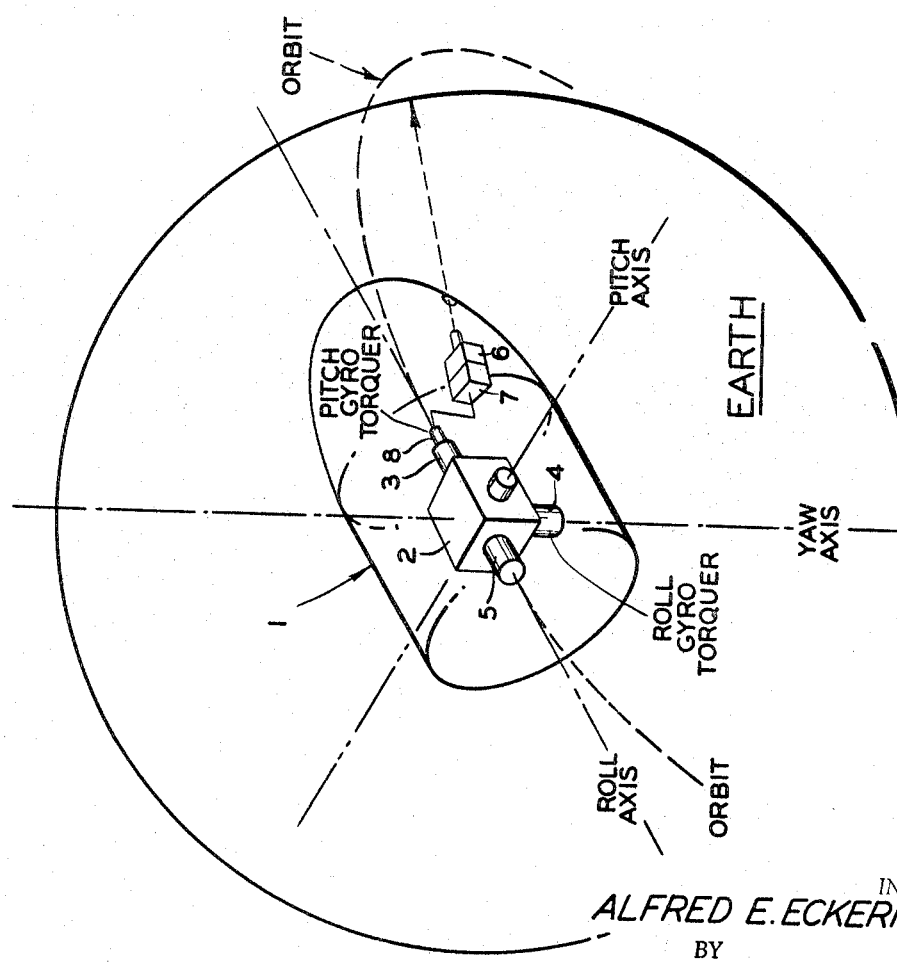
FIGURE 1 is a perspective view of a space vehicle with parts of its housing broken way to expose a schematically indicated interial guidance system.

Referring to FIGURE 1, there is shown a space vehicle 1 having a spatially, gyroscopically stabilized platform 2. This guidance device is of a type that is generally known in the missile art, and may be of the type described and shown in U.S. Patent No. 2,963,242 granted Dec. 6, 1960, to Fritz K. Mueller and assigned to the United States of America. As described therein, platform 2 is mounted on gimbals and its pitch, yaw and roll gyroscopes 3, 4, 5, respectively, may be utilized directly in connection with a known jet or flywheel attitude control system for control of the satellite's attitude.

Figure 2:
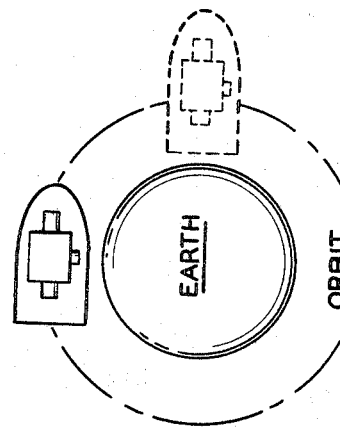
FIGURE 2 is a diagrammatic view of a gyroscopically stabilized satellite showing the orientation of a space vehicle that would occur at two points in its orbit about the earth if there were no supervision of its pitch axis gyroscope.
Figure 3:
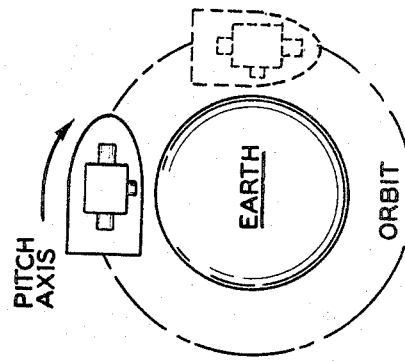
FIGURE 3 is a diagrammatic view of a gyroscopically stabilized satellite, having means for supervision of its gyroscopes showing its correct orientation at two points in its orbit about the earth.

In the desired attitude of the vehicle, the pitch axis is perpendicular to the flight path and parallel to the earth's surface. For this condition to be achieved in an orbiting space vehicle, the same side of stabilized platform 2 must be faced toward the earth throughout its orbit. This requires the vehicle to be continuously rotated about its pitch axis in the direction indicated by the arrow in FIGURE 3. If such continuous rotation were not provided the satellite it would continually change its position relative to the horizon, as indicated in FIGURE 2.

Referring again to FIGURE 1, the continuous alignment in parallelism with the horizon is made possible by the pitch axis horizon sensor or scanner 6. The horizon scanner 6 may be fixed to the stabilized platform or to the satellite's housing. In either event, the scanner indicates any change in its line of sight toward the horizon by a signal voltage, the polarity of which is dependent on whether the scanner's line of sight has shifted to a point above or below the horizon. This voltage is amplified in amplifier 7 and supplied to electromagnetic torquer 8 which places a torque on the spinning mass of pitch axis gyroscope 3. Due to this torque, the gyroscope will precess in such a direction as to move the platform and/or vehicle about its pitch axis to correct for deviation about the pitch axis. Since the vehicle is traversing a path parallel to the horizon, this correction will be continual. In addition, the horizon scanner will provide intermittent correction signals for undesired movement of the platform about its pitch axis, due to drift of the pitch gyroscope or to other stability disturbing factors.

Figure 4:
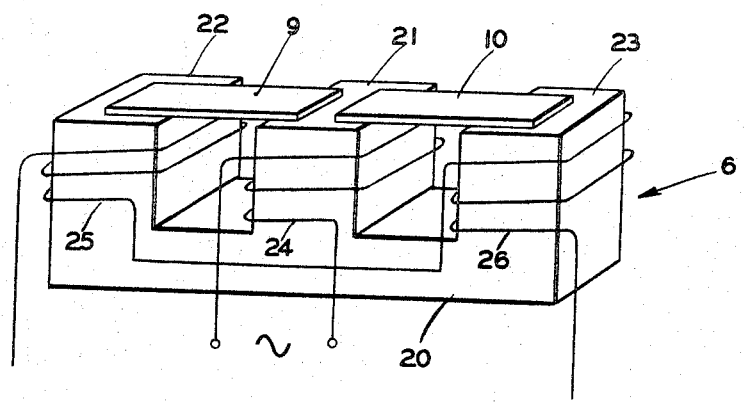
FIGURE 4 is a perspective view of a horizon scanner constructed in accordance with the present invention.

Referring to FIGURE 4, the horizon scanner 6 is shown as essentially comprising a bridge transformer including a base 20, primary core 21, and secondary cores 22 and 23 constructed from a ferromagnetic material such as Armco iron or nickel. A temperature sensitive gadolinium strip 9 links primary core 21 to secondary core 22 providing a temperature sensing magnetic flux path between primary and secondary cores 21 and 22. A temperature sensitive gadolinium strip 10 links primary core 21 to secondary core 23 providing a temperature sensitive magnetic flux path between primary and secondary cores 21 and 23. Primary core 21 is wound by primary winding 24 which is connected to a suitable A.C. source. Secondary cores 22 and 23 are wound by secondary windings 25 and 26, respectively.

Figure 5:
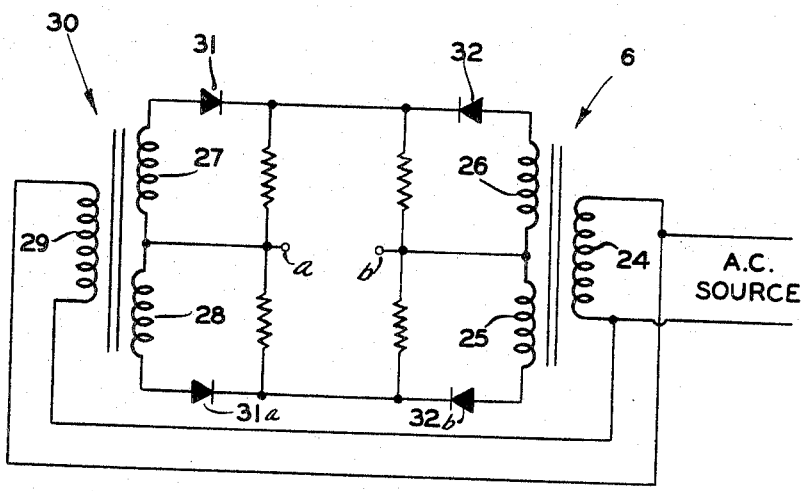
FIGURE 5 is a simplified circuit diagram of a circuit utilized in the horizon scanner for generating a control signal in response to a change in magnetization of the magnetic circuits.

Referring to FIGURE 5, there is shown a simplified circuit diagram utilizing the pitch axis horizon sensor or scanner 6 as a bridge transformer. The bridge transformer 6 includes the primary winding 24 and secondary windings 25 and 26 whose outputs vary with the thermal energy received by gadolinium strips 9 and 10, respectively. Windings 27 and 28 are the secondary windings of a conventional bridge transfer 30 including a primary winding 29. Bridge transformer 30 is similar to bridge transformer 6 except that gadolinium strips 9 and 10 are replaced by strips made of the same material as the remainder of the transformer. Since gadolinium strips 9 and 10 are replaced by magnetic material which is not temperature dependent, the outputs from secondary windings 27 and 28 are invariant. Diodes 31, 31A, 32 and 32A convert the A.C. voltage to a D.C. voltage. The same excitation voltage which excites the primary winding 24 and induces a current in secondary windings 25 and 26 excites the primary winding 29 to induce a current in the secondary windings 27 and 28 thereby ensuring that any change in excitation potential will effect all four outputs in the same manner and therefore have only a small negligible secondary effect on the final output applied to output terminals a and b.

Referring first to FIGURE 4, the operation will now be described. A continuous alternating current is passed through primary coil 24. The alternating current flowing through primary coil 24 produces in primary core 21 an alternating magnetic flux which is linked by the base 20 and the gadolinium strips 9 and 10 to the secondary cores 22 and 23. The alternating magnetic flux through the secondary cores 22 and 23 then generates an alternating electromotive force in the secondary windings 25 and 26. The magnitude of the voltage generated in either secondary winding is proportional to the amount of and time rate of change of the magnetic flux which passes through its core. In turn, the amount of magnetic flux passing through the cores 22 and 23 is dependent on the temperature of the gadolinium strips 9 and 10. If one gadolinium strip is allowed to receive more thermal radiation than its counterpart, its temperature rise will reduce the magnetic flux in its associated secondary core and reduce the voltage output of its associated secondary winding. The cooler gadolinium strip passes more magnetic flux resulting in an increase in the amount of magnetic flux in the associated secondary core and increase the voltage output in the secondary winding associated with the cooler strip.

Referring to FIGURES 4 and 5, primary winding 29 is excited by the same excitation source as primary winding 24 and the alternating current flowing therethrough produces in the primary core a transformer 30 an alternating magnetic flux which is linked to the secondary cores of bridge transformer 30. The alternating magnetic flux in the secondary cores of bridge transformer 30 generates an alternating electromotive force in secondary coils 27 and 28. The arrangement is such that the voltage induced in secondary winding 27 is in phase and equal to the voltage induced in secondary winding 26 when gadolinium strip 10 fully exposed to space. The voltage induced in secondary winding 28 is in phase and equal to the voltage induced in secondary winding 25 when gadolinium strip 9 is fully exposed to earth. Thus, when gadolinium strip 9 is fully exposed to earth, and gadolinium strip 10 is fully exposed to space, a zero output voltage appears at output terminals a and b.

Figure 6:
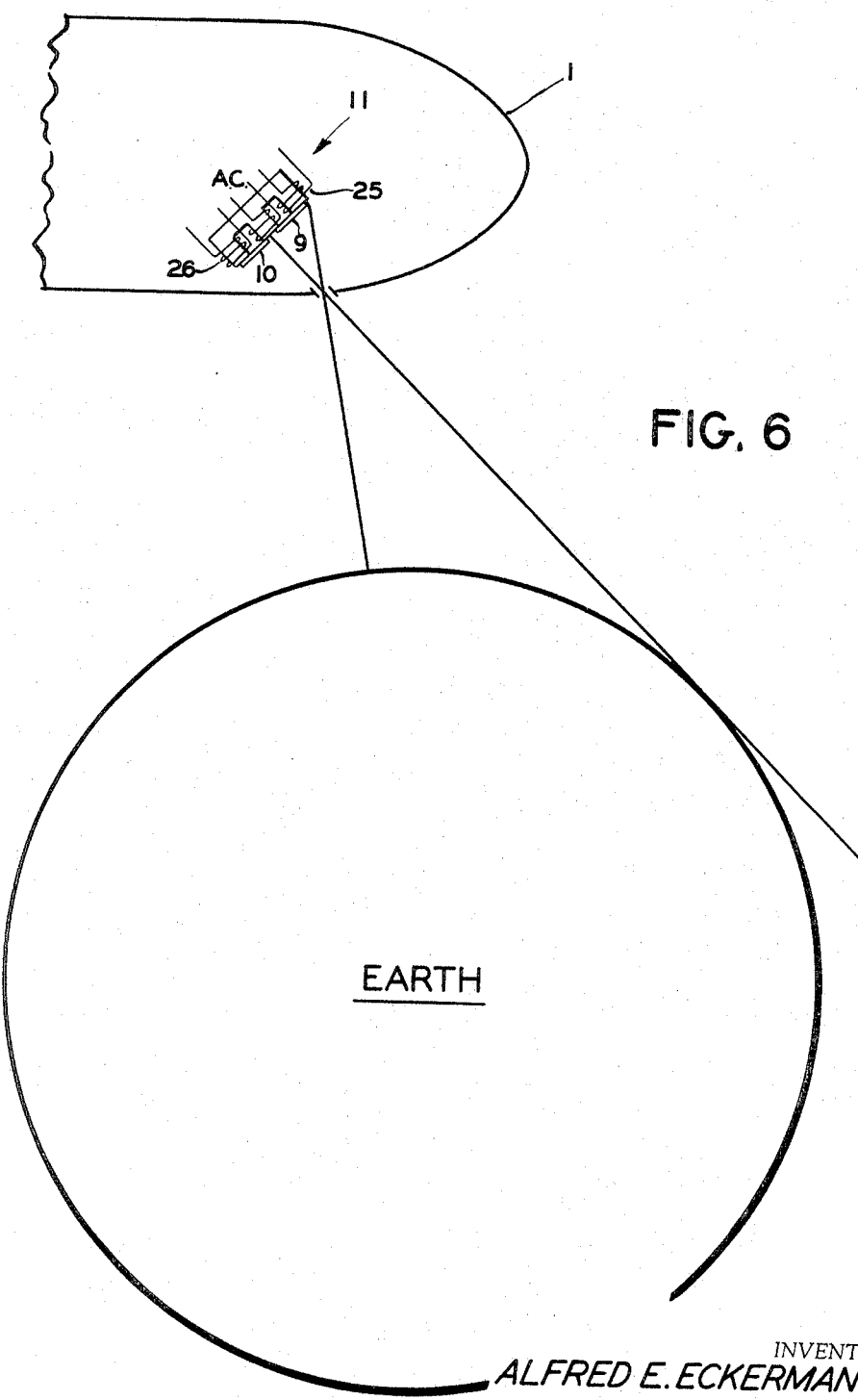
FIGURE 6 is a schematic view illustrating the operative relation of a horizon scanner, constructed in accordance with the present invention, with the horizon of the earth. The scanner is shown greatly enlarged in relation to the earth for ease of illustration.

Referring to FIGURE 6, a space vehicle is shown having horizon scanner 6 mounted thereon. The space vehicle and horizon scanner are shown greatly enlarged in relation to the earth for purposes of illustration. As shown, the whole of gadolinium strip 9 is exposed to infra red radiation emitted from the earth while gadolinium strip 10 is exposed only to space, neighboring the horizon. The imaging effect may be accomplished by a conventional optical system. In this position, the space vehicle 1 is aligned with its pitch axis parallel to the earth's surface, gadolinium strip 9 is exposed fully to the earth and gadolinium strip 10 is exposed fully to space. Under these conditions, equal voltages are generated in coils 26 and 27 and equal voltages are generated in secondary coils 25 and 28 producing a zero output voltage at output terminals a and b.

Should the vehicle nose up, gadolinium strip 10 will continue to be fully exposed to space while only a portion of gadolinium strip 9 will be exposed to earth and the remainder exposed to space. The inductive coupling between primary winding 24 and secondary winding 26 remains substantially the same and therefore, the voltage generated in winding 26 is equal to the voltage generated in winding 27. However, the inductive coupling between primary winding 24 and secondary winding 25 increases due to the decrease in temperature of gadolinium strip 9, and the voltage generated in secondary winding 25 is thereby made greater than the invariant voltage generated in secondary coil 28 (FIGURE 5). This provides a voltage output at terminals $a$ and $b$ with voltage at $b$ greater than the voltage at $a$.

When the space vehicle noses down, the gadolinium strip 9 will remain fully exposed to radiation emitted from the earth and a portion of gadolinium strip 10 will also be exposed to radiation emitted by the earth and the remainder will be exposed to radiation emitted by space. The inductive coupling between primary winding 24 and secondary winding 25 remains the same as when the pitch axis of the space vehicle was parallel to the earth's surface, and therefore, the voltage generated in secondary winding 25 is equal to voltage generated in winding 28. However, the inductive coupling between secondary winding 26 and primary winding 24 now decreases due to the increase in temperature of gadolinium strip 10 and, the invariant voltage generated by winding 27 is thereby made greater than the voltage generated by winding 26. This provides a voltage output at output terminals $a$ and $b$, with the voltage at $a$ greater than the voltage at $b$. However, the polarity of output signal in the nose down condition of the space vehicle 1 is opposite to the polarity of the signal generated in the nose up condition as the potential at $a$ is now greater than the potential at $b$; whereas in the nose up condition of the space vehicle 1, the potential at $b$ was greater than the potential at $a$.

Figure 7:
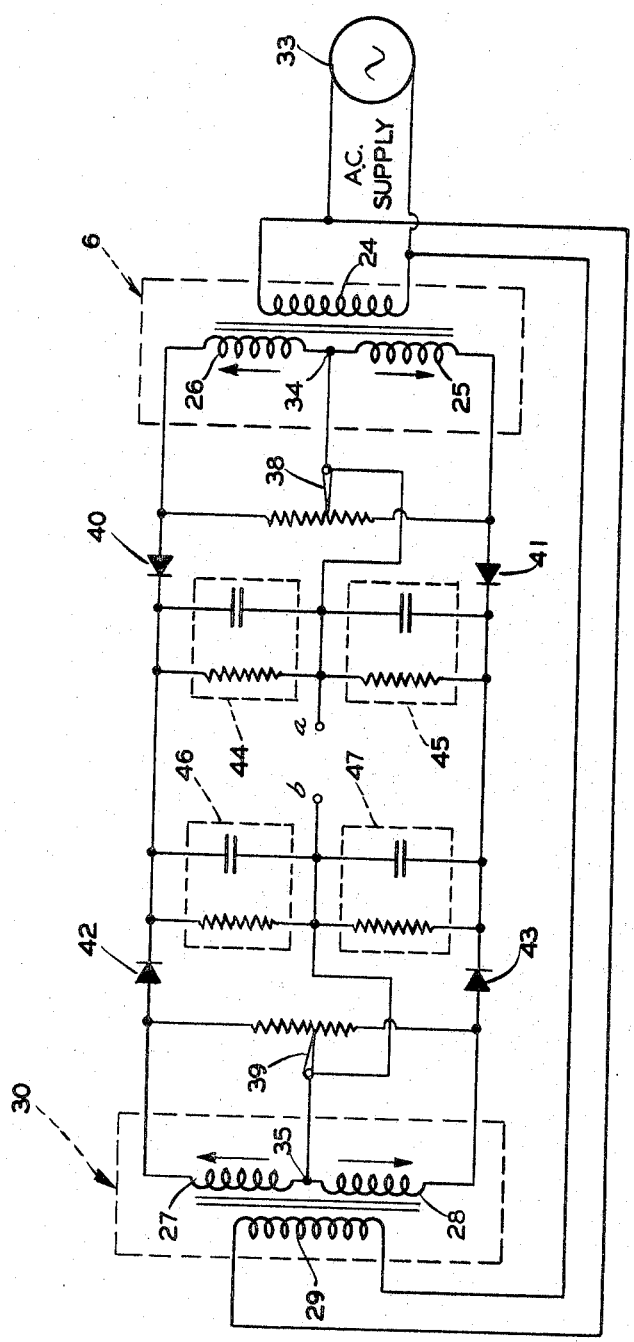
FIGURE 7 is a detailed circuit diagram of the circuit shown in FIGURE 5.

Referring to FIGURE 7, a detailed circuit diagram of the signal generating circuit is shown. Primary winding 24 of the bridge transformer 6 is supplied by source 33 with a suitable alternating current. Secondary windings 25 and 26 of transformer 6 are interconnected at a common connection 34. The connection at 34 is such that the voltages induced in secondary windings 25 and 26 are equal and opposite, as indicated by arrows, when gadolinium strips 9 and 10 of transformer 6 are at thermal radiative equilibrium.

Primary winding 29 of the conventional bridge transformer 30 is also supplied by source 33 with a suitable source of alternating current. Secondary windings 27 and 28 of transformer 30 are interconnected at a common connection 35. The connection at 35 is such that the voltages induced in the secondary windings 27 and 28, as indicated by arrows, are equal and opposite at all times.

Voltage divider networks 38, connected across the output terminals of transformer 6, and the voltage divider network 39, connected across the output terminals of transformer 30 are so adjusted that the voltage induced in coil 27 is in phase and equal to the voltage induced in coil 26 when gadolinium strip 10 is fully exposed to space and the voltage induced in secondary coil 28 is in phase and equal to the voltage induced in secondary coil 25 when gadolinium strip 9 is fully exposed to earth. Diodes 40, 41, 42, and 43 rectify the voltage output from transformers 30 and 6. The RC networks at 44, 45, 46, and 47 function as filter circuits and increase somewhat the magnitude of the output appearing at terminals $a$ and $b$.

Figure 8:
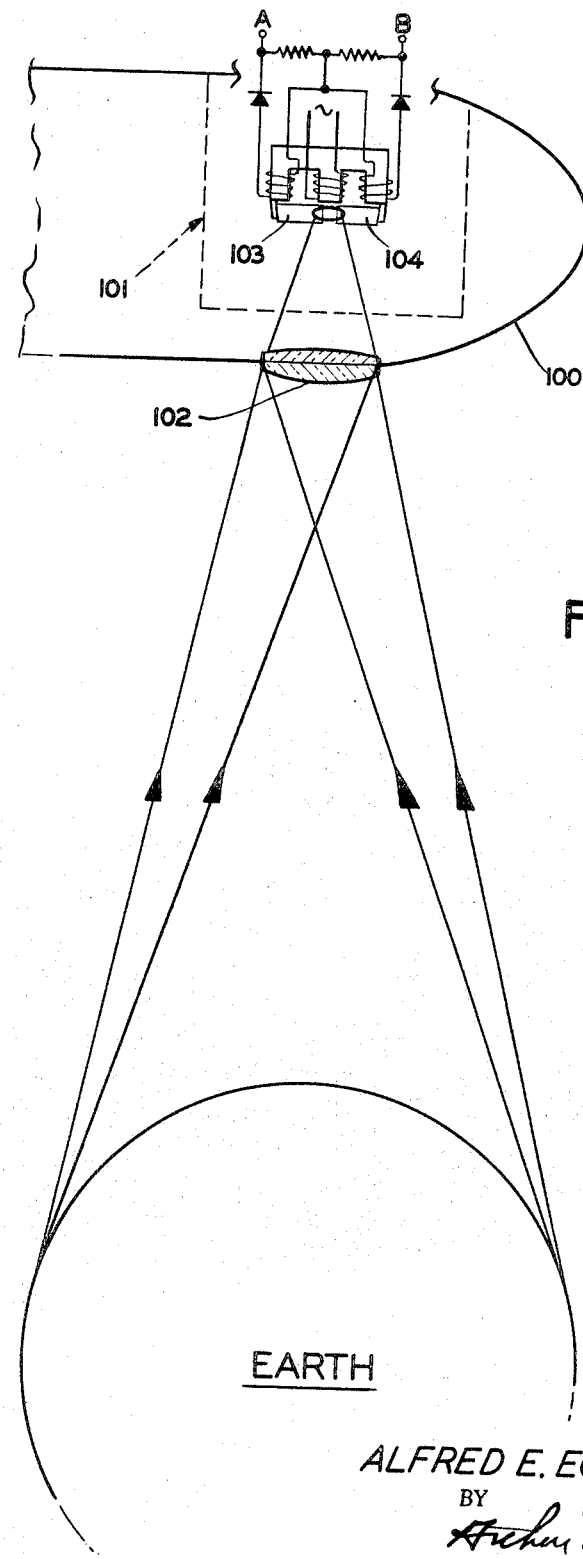
FIGURE 8 is a schematic view illustrating a modification of the present invention.

A modification of the horizon scanner shown in FIGURES 1–6 is illustrated in FIGURE 8. The signal generating means utilized in the modification is considerably simpler than that employed in the horizon scanner shown in FIGURES 1–6. The modification is advantageously employed when the orbit of a space vehicle is a considerable distance from the earth.

Referring to FIGURE 8, the earth is shown as it would be seen from spaceborne vehicle 100 if the space vehicle were orbiting in a range greater than 25,000 miles from the earth. The attitude control system for space vehicle 100 has been omitted, however, it is to be understood that it may be of the type shown in FIGURE 1.

A horizon scanner 101, including a two element gadolinium detector, identical to that shown in FIGURE 4, is mounted on the vehicle 100 at the focal point of a conventional infrared transmitting lens 102 which has the ability to transmit with undiminished magnitude and focus the black body radiation emanating from the earth. As shown, the image is equally divided on gadolinium strips 103 and 104. This results in each of the elements 103 and 104 being equally heated thereby rendering the rectified potentials at output terminals $a$ and $b$ equal. In this condition, the pitch axis of the space vehicle is parallel to the surface of the earth.

Let us assume the vehicle noses up. Gadolinium strip 104 increases in temperature above that of gadolinium strip 103 as more of the earth's image falls on strip 104 than on strip 103. Consequently, the rectified signal output at B, which is controlled by strip 104, is less than the rectified signal output at A, which is controlled by element 103. This polarized signal may be utilized by the guidance control system for vehicle 100 to swing the vehicle in the nose down direction so that the vehicle is parallel to the surface of the earth.

Should the vehicle 100 nose down, the earth's image falls more on strip 103 than on strip 104. Gadolinium strip 103 heats up with a consequent falling of potential at output terminal A, while, simultaneously, the element 104 will be cooling and the potential at output terminal B increasing. Output terminal B will now be a higher potential than the potential at ouput terminal A resulting in an output signal of polarity opposite to the polarity of the output signal when the vehicle 100 is in a nose down condition. The guidance system will now swing the vehicle 100 in the opposite direction so as to cause the earth's image to fall midway between strips 103 and 104 as shown in FIGURE 8.

The transition in magnetic properties of metals occurs at the Curie point, defined as the temperature above which ferromagnetic materials lose their spontaneous magnetization. Gadolinium (element number 64 in the periodic table) has the unusual property of becoming ferromagnetic at temperature of 17° C., below which its magnetization is a function of temperature.

Figure 9:
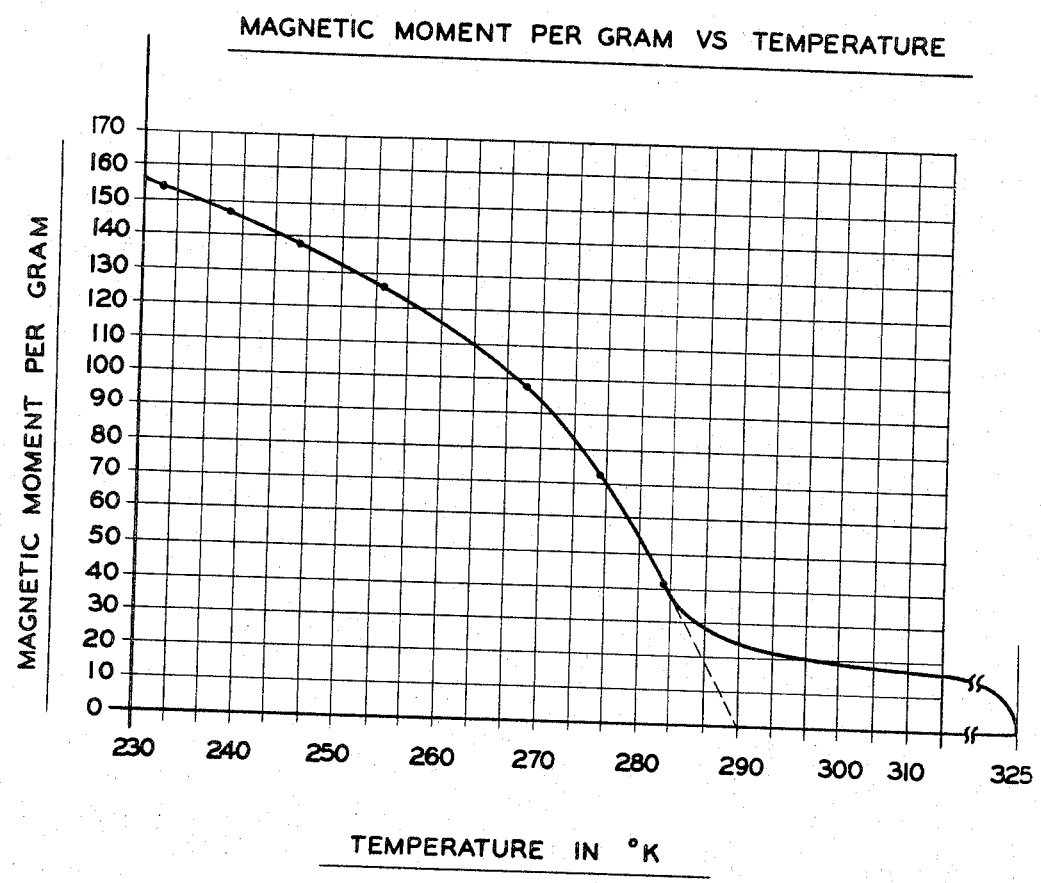
FIGURE 9 is a graph depicting the magnetization vs. temperature dependence of gadolinium.

The use of gadolinium as a detector element is of special significance. Referring to FIGURE 9, a graph depicting the magnetization vs. temperature dependence of gadolinium is shown. This graph is taken from an article by Elliott, Egvold and Spedding appearing in The Physical Review, vol. 91, page 28, July 1, 1953. The unusual ferromagnetic properties of gadolinium which are exploited in a detector constructed in accordance with the present invention are:

(1) Gadolinium is a homogeneous metal; and of all the materials available, metals are least susceptible to radiation damage.

(2) In the region of interest (the temperature range of a spaceborne vehicle) the magnetization vs. temperature characteristic of gadolinium has an extremely pronounced and linear slope.

(3) Gadolinium has a relatively high value of saturation magnetization at absolute zero. The saturation moment is 7.12 Bohr magnetrons. Iron, for comparison, has a saturation moment of 2.2 Bohr magnetrons.

These features are of primary importance as they result in a relatively high change in saturation magnetization per degree change in temperature (approx. 20–30 times higher for gadolinium than for either iron, cobalt or nickel, the three common ferromagnetic materials). In the range of −50° C. to +17° C., a relatively high change in magnetic circuits can be obtained when gadolinium transformer cores are exposed to thermal radiation. This range of temperatures corresponds with the requirements of many spaceborne vehicles.

Above its Curie point, 17° C. (290° K.), gadolinium has an extremely high susceptibility value in the paramagnetic region. This allows induced magnetization to be achieved by the alternating magnetic fields flowing through the bridge transformer at temperatures above the spontaneous magnetization point and, therefore, its magnetization is temperature dependent above its Curie point extendings its operating capability up to 50° C. (323° K.) thereby encompassing the full temperature range of all spaceborne vehicles.

In the paramagnetic phase, the temperature vs. magnetization characteristic of gadolinium does not have as pronounced a slope as it does in its ferromagnetic phase. If desired, when a particular application requires a Curie point above 17° C., the gadolinium may be alloyed with other materials having higher Curie points. A Heusler alloy MnAs containing 1 part manganese to 1 part arsenic and having a Curie point of 45° C. is suitable for this purpose. FeC containing 1 part iron to 1 part carbon and having a Curie point of 213° C. is also suitable. The amount of alloying material added to gadolinium will be dependent on the Curie point desired and is a matter well within the skill of the art.

While the horizon scanner has been shown and described as a means for detecting pitch error, it may be utilized to detect roll and yaw error in a manner well known in the art. Moreover, the present invention may have many other useful applications as would occur to one skilled in the art. For example, it may be used to detect temperature differences by conduction if the temperature sensitive elements of the device are immersed in a heat conducting medium, such as a gas, liquid or solid.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Apparatus comprising a flight vehicle signal generating means mounted on said flight vehicle and including magnetic circuit means having sensing means responsive to infrared radiation for varying the magnetization of said magnetic circuit means, means for exposing said sensing means to a source of infrared radiation having a fixed relation to a spatial reference, said signal generating means including means responsive to a change in the magnitization of said magnetic circuit means for generating a control signal varying in polarity and magnitude corresponding to the direction and extent said flight vehicle departs from a desired attitude relative to said spatial reference.

2. Apparatus as defined by claim 1 including means responsive to said control signal for controlling said flight vehicle whereby said flight vehicle maintains a predetermined desired attitude relative to said spatial reference.

3. Apparatus as defined by claim 1 wherein said spatial reference is the horizon of the earth.

4. Apparatus as defined by claim 1 wherein said sensing means is made of gadolinium material.

5. Apparatus as defined by claim 1 wherein said sensing means is made of a gadolinium alloy material.

6. A horizon scanner comprising magnetic circuit means, means for exposing said magnetic circuit means to a source of thermal energy generating infrared radiation, said magnetic circuit means including gadolinium sensing means responsive to infrared radiation generated by said source of thermal energy for varying the magnetization of said magnetic circuit means, and signal generating means responsive to the magnetization of said magnetic circuit means for generating a signal varying in accordance with the departure of said gadolinium means from a desired attitude relative to said source of thermal energy.

7. An infrared detector comprising magnetic circuit means including gadolinium sensing means responsive to infrared radiation for varying the magnetization of said magnetic circuit means, and signal generating means responsive to a change in magnetization of said magnetic circuit means for generating an electrical signal varying with the extent to which said gadolinium sensing means is exposed to infrared radiation.

8. A thermal energy detector comprising magnetic signal generating means for generating a signal, means including two thermal detector elements for varying magnetization of said magnetic means to vary said signal in magnitude in accordance with the amount of thermal energy received by said two thermal detector elements and for varying said signal in polarity according to reception of thermal energy by one or both of said thermal detector elements.

9. A thermal energy detector as defined by claim 8, wherein said two thermal detector elements are made of a gadolinium material.

10. Apparatus for controlling the attitude of a space vehicle, comprising a thermal energy detector consisting of two thermal sensitive elements, means for exposing said two thermal sensitive elements to a source of thermal radiation, magnetic signal generating means responsive magnetically to variations in thermal energy received by said two thermal sensitive elements for generating a control signal varying in magnitude and polarity in accordance with the extent and direction the space vehicle deviates from a predetermined desired attitude relative to said source of thermal energy, and means responsive to said control signal for orienting said space vehicle to said predetermined desired attitude relative to said source of thermal radiation.

References Cited

UNITED STATES PATENTS

| | | | |
|---|---|---|---|
| 2,222,425 | 11/1940 | Wehe | 250—83.3 |
| 2,489,223 | 11/1949 | Herbold. | |
| 2,740,961 | 4/1956 | Slater. | |
| 2,963,243 | 12/1960 | Rothe | 244—1 |
| 3,141,974 | 7/1964 | Auphan | 250—83.3 |
| 3,167,706 | 1/1965 | Doyle | 324—.5 |

FERGUS S. MIDDLETON, *Primary Examiner.*